Figure 11:
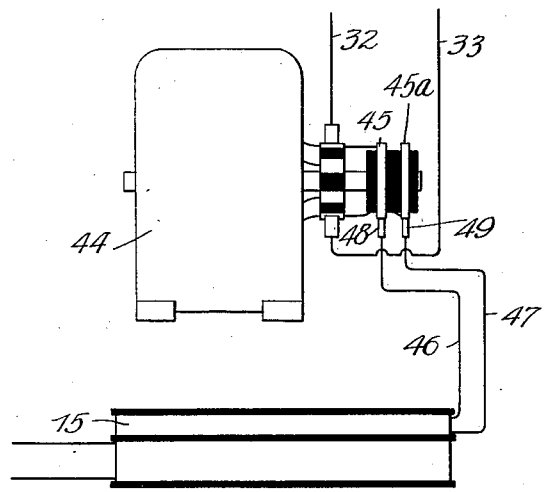

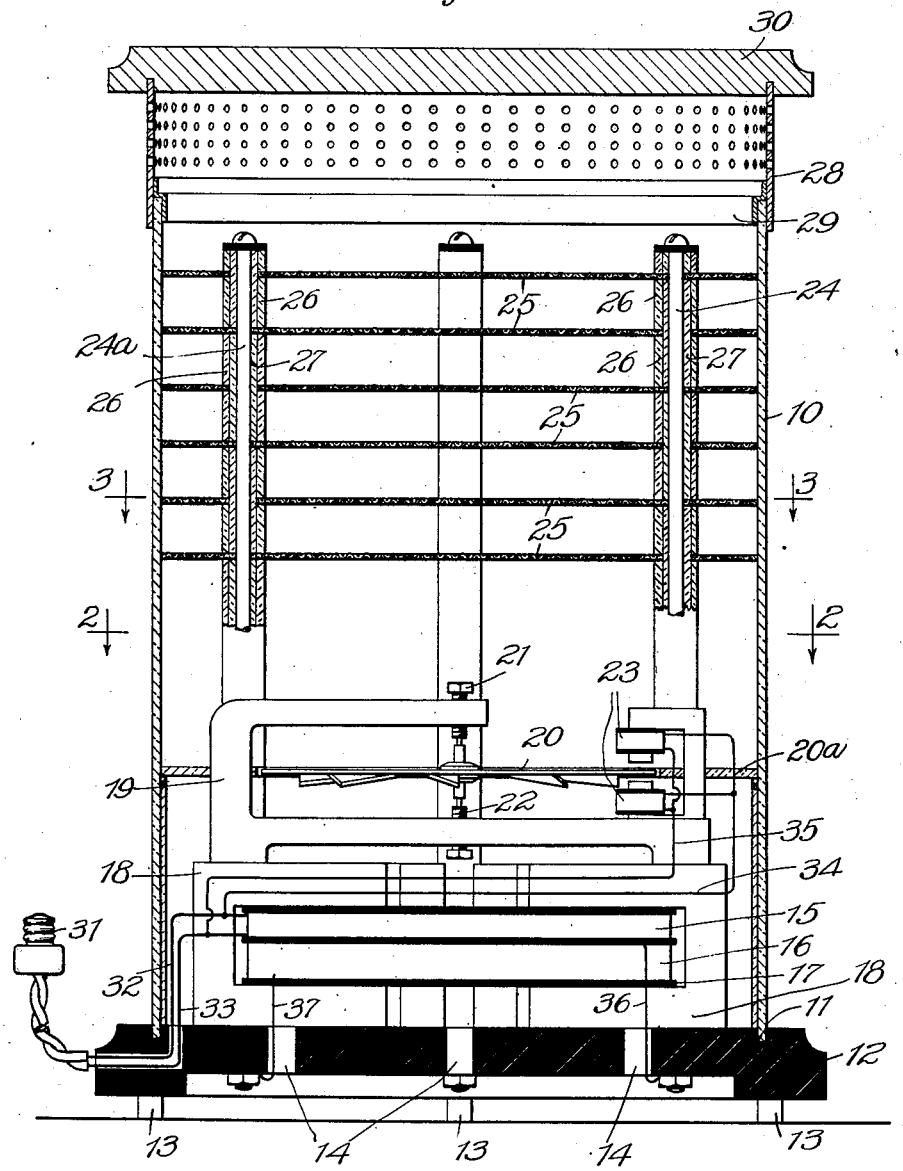

S. C. SHAFFNER.
MEANS FOR FILTERING AIR AND PRODUCING OZONE.
APPLICATION FILED MAY 10, 1909.
977,335.
Patented Nov. 29, 1910.
6 SHEETS—SHEET 2.
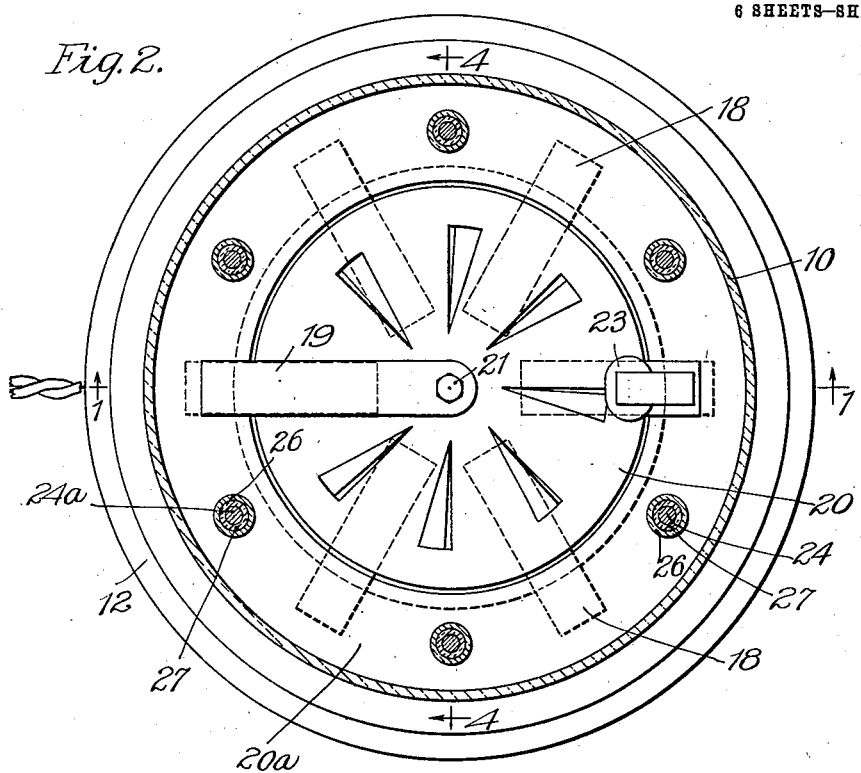
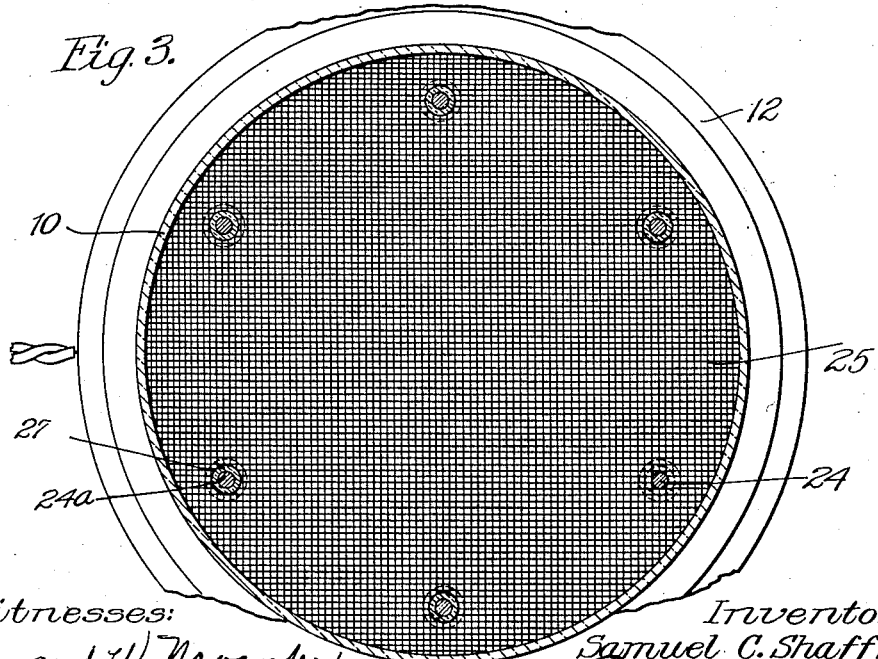

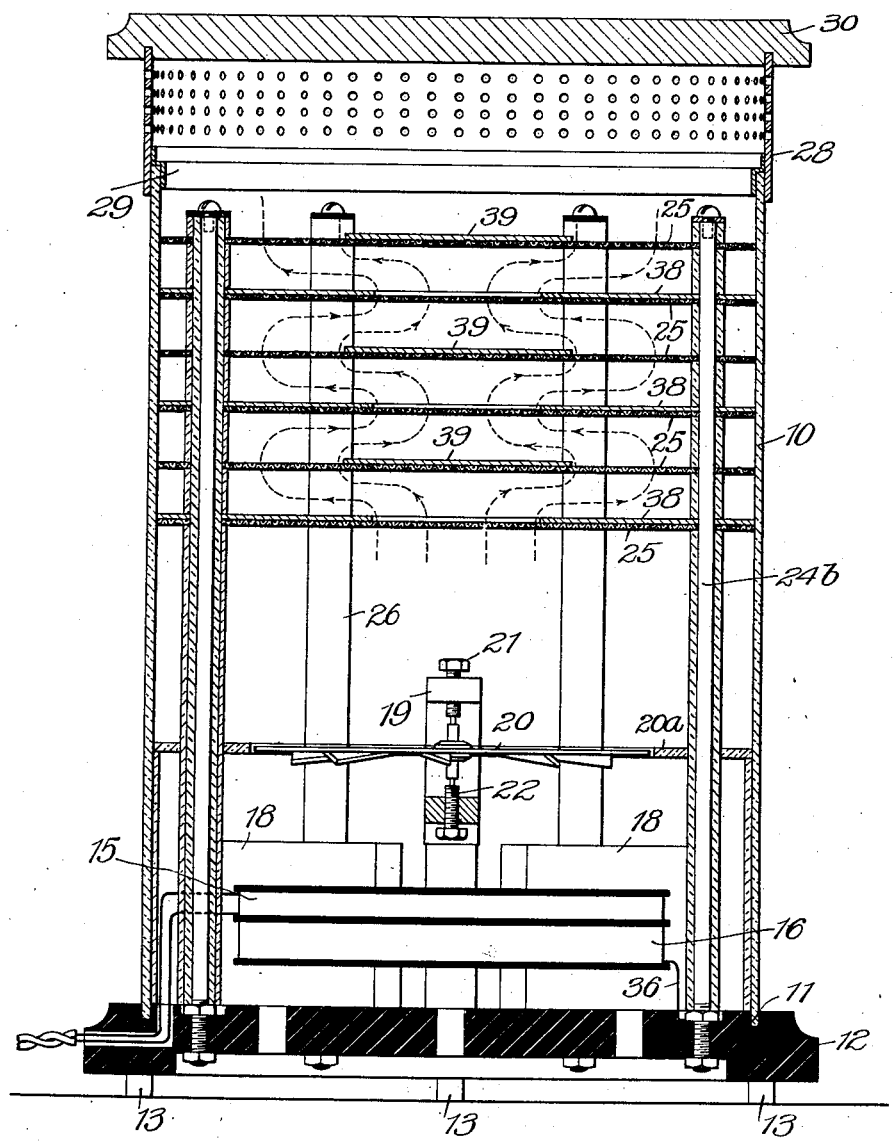

S. C. SHAFFNER.
MEANS FOR FILTERING AIR AND PRODUCING OZONE.
APPLICATION FILED MAY 10, 1909.
977,335.
Patented Nov. 29, 1910.
6 SHEETS—SHEET 4.
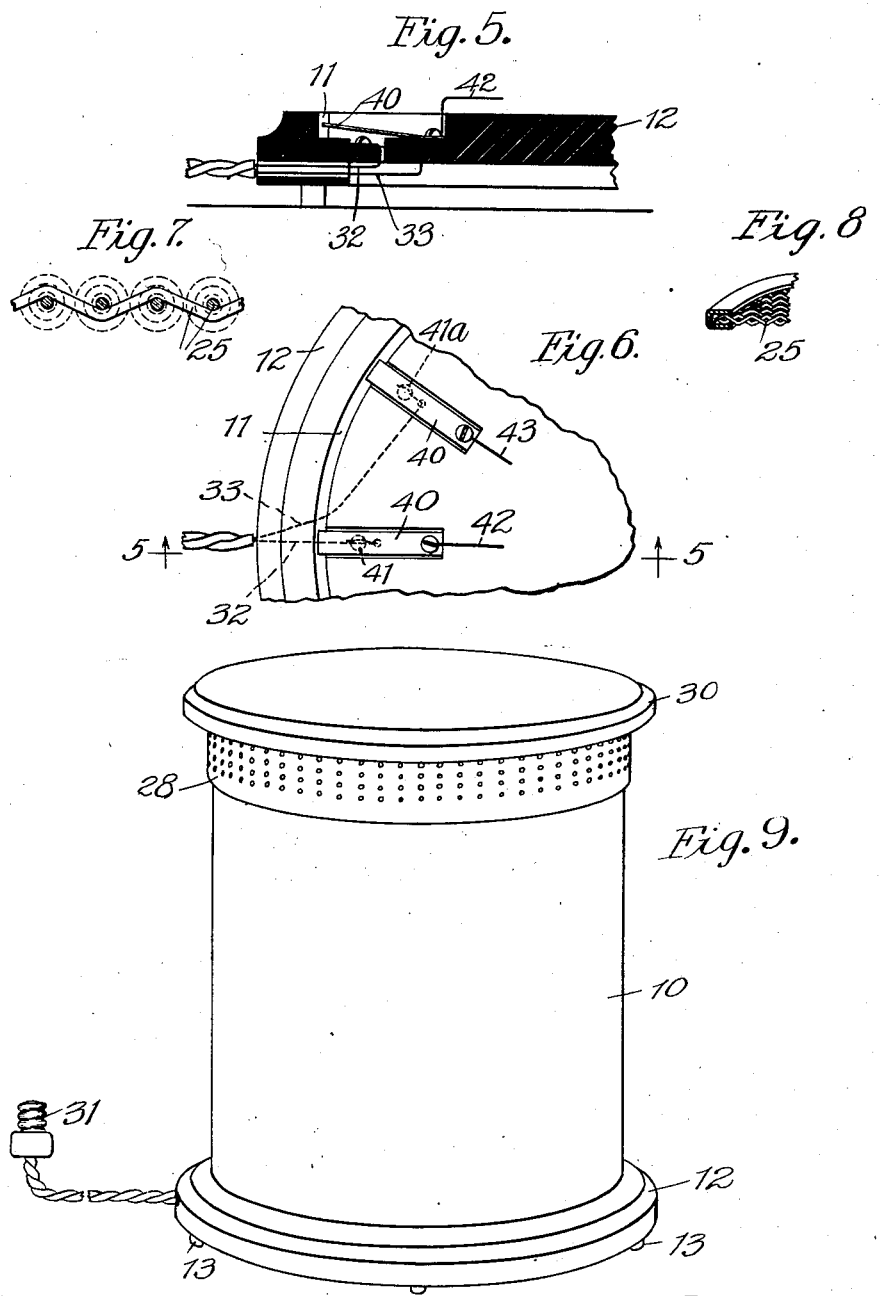

S. C. SHAFFNER.
MEANS FOR FILTERING AIR AND PRODUCING OZONE.
APPLICATION FILED MAY 10, 1909.

977,335.

Patented Nov. 29, 1910.
6 SHEETS—SHEET 5.

Witnesses:
Leonard W. Novander
Albert G. McCaleb

Inventor
Samuel C. Shaffner
By Brown & Hillia
Attorneys

S. C. SHAFFNER.
MEANS FOR FILTERING AIR AND PRODUCING OZONE.
APPLICATION FILED MAY 10, 1909.

977,335.

Patented Nov. 29, 1910.

6 SHEETS—SHEET 6.

Witnesses:
Leonard W. Novander
Albert H. McCaleb.

Inventor
Samuel C. Shaffner
By Brown Williams
Attorneys

UNITED STATES PATENT OFFICE.

SAMUEL C. SHAFFNER, OF CHICAGO, ILLINOIS, ASSIGNOR TO NATIONAL AIR FILTER COMPANY, OF CHICAGO, ILLINOIS, A CORPORATION OF ILLINOIS.

MEANS FOR FILTERING AIR AND PRODUCING OZONE.

977,335. Specification of Letters Patent. Patented Nov. 29, 1910.

Application filed May 10, 1909. Serial No. 495,098.

*To all whom it may concern:*

Be it known that I, SAMUEL C. SHAFFNER, a citizen of the United States, residing at Chicago, in the county of Cook and State of Illinois, have invented a certain new and useful Improvement in Means for Filtering Air and Producing Ozone, of which the following is a full, clear, concise and exact description, reference being had to the accompanying drawings, forming a part of this specification.

It is an object of my invention to construct a device adapted to remove from contaminated air the impurities of an organic nature that are so effective in transmitting disease.

It is a further object of my invention to supply to the air thus purified ozone in such quantities as to impart to the air considerable increase in its efficacy to support and stimulate animal life.

My invention also has for its object the filtering of the air treated by which particles of impure matter, both organic and inorganic, are separated from the air and retained by the filtering mechanism.

My invention consists essentially in producing zones electrically charged and in causing the air to be purified to pass directly through the zones thus charged.

In my invention I find it convenient to employ screens for effecting the distribution of electrical charge in such a manner that the air being purified must necessarily come in contact with the electrical charges.

In my invention I prefer to employ a plurality of screens which may be arranged in any desired manner and charged from any suitable source of electricity that will produce the desired result. An arrangement that I have found to be very effective is the use of a plurality of screens in parallel planes, alternate ones of such screens being connected to one terminal of a high tension transformer, while the intermediate screens are connected to the other terminal of such secondary winding. Other arrangements may be employed for securing this condition of charge, as, for instance, all of the screens may be connected to the same terminal of the secondary winding, and the condition of charge of all of the screens will in this case be of the same sign.

By my invention I am able to free air from the contamination resulting from disease germs and various bacilli that are deleterious in their effect upon human life, by bringing these germs and organisms into contact with the electrification above described, with the result that the active principle of the germs and organisms is entirely destroyed, and they are therefore incapable thereafter of producing injurious effects. Furthermore, the condition of electrification referred to as a result of being produced by a high tension source, produces ozone in considerable quantities, which, as is well known to the medical profession, is an invaluable agent for imparting to the atmosphere vitiated by use the elements that are needed to promote and stimulate the activities of animal organizations, and particularly human beings, in such a manner as to protect them in large degree from the attack of disease and to effect the elimination of disease tendencies which are so prevalent and result so disastrously in many cases.

Figure 10:
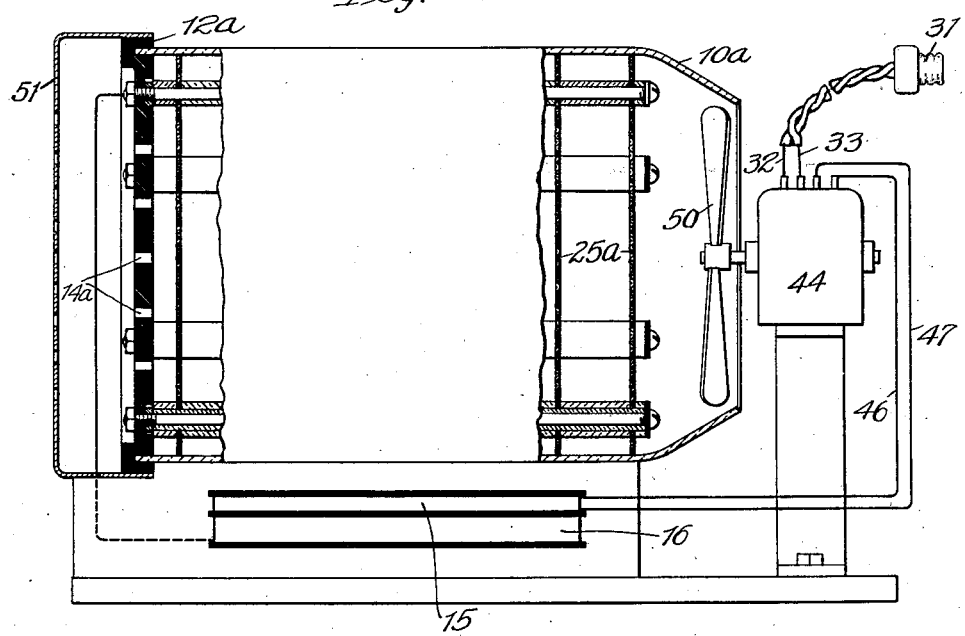
Figure 12:
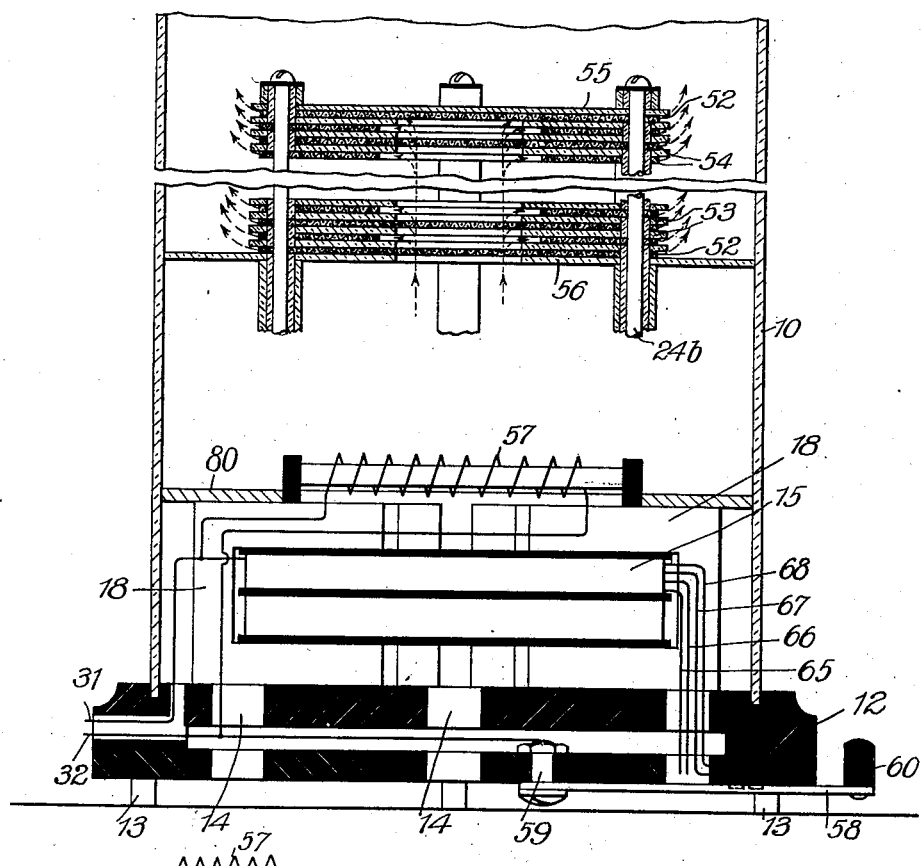
Figure 13:
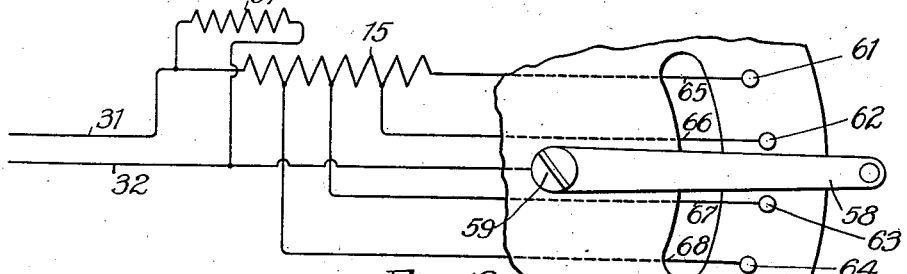

The several drawings illustrating my invention are as follows:

Figure 1 is a vertical sectional view taken along the line 1, 1 in Fig. 2, and shows my complete device in its preferred embodiment; Fig. 2 is a transverse sectional view of the device taken along the line 2, 2 in Fig. 1; Fig. 3 is a transverse sectional view through the device taken along the line 3, 3 in Fig. 1; Fig. 4 is a view similar to Fig. 1, taken along the line 4, 4 in Fig. 2; Fig. 5 is a detail view of a part of the base showing in vertical section the arrangement of automatic switch mechanism employed; Fig. 6 shows in top view the parts shown in Fig. 5; Fig. 7 is an enlarged detail view of a portion of one of the screens, showing diagrammatically the distribution of electrical charge around the wires of the screen; Fig. 8 is a detail view of an edge reinforcement that may be used in connection with the screens; Fig. 9 is a perspective view of the device shown in Figs. 1 and 4 as completely assembled; Fig. 10 shows a modification that is adapted for use in locations not provided with alternating current supply mains, this modification being similar in its operation to that shown in Figs. 1 and 4, with the exception that it is adapted to be operated by direct current supply and that the mechanism is differently disposed; Fig. 11 is a diagrammatic view of the circuit relations used between the direct current mains and the transformer in the modification shown in Fig. 10; Fig. 12 shows in a view similar to Fig. 1 the arrangement of screens such that the air in passing through them traverses a plurality of parallel paths, while in the modification shown in Figs. 1 and 4, the air passes through the screens one after another in series relation. Fig. 13 shows in bottom view the base used in the modification shown in Fig. 12, and in this figure the circuit arrangements are shown diagrammatically.

Similar numerals refer to similar parts throughout the several views.

As shown in Figs. 1 to 4, inclusive, my device consists of a glass tube 10 supported in an annular recess 11 in an insulating base 12. The base 12 is provided with feet 13, which separate the bottom of the base from the table or stand on which the device may be located. Openings 14 are provided through the base to permit the air to enter under the base and into the lower part of the tube 10. The base 12 supports a transformer consisting of a primary winding 15 and secondary winding 16 wound upon a spool 17, through and around which a plurality of magnetic paths 18 is arranged. Each magnetic path is composed of laminated iron in order to reduce the magnetic losses resulting from the transformer action to a minimum. As shown in Fig. 2, the magnetic paths 18 are so disposed as not to entirely fill the space within the spool 17, as a result of which the air entering by the openings 14 is permitted to pass between the paths 18 and into the inside of the tube 10. The magnetic paths 18 support a framework 19, from which a fan 20 is supported by adjustable pivots 21 and 22. The fan 20 is adapted to be rotated by the inductive effect of magnets 23 connected to a source of alternating current supply. The base 14 also supports a plurality of bolts or rods 24, 24$^a$, six of such rods being used in the construction shown in the drawings. These rods are adapted to support in parallel planes a plurality of screens 25, which are insulated from the rods as desired by means of glass or porcelain tubing, or other good insulators. As shown in Fig. 1, alternate screens 25 are connected to the rod 24, while the intermediate screens 25 are connected to the rod 24$^a$. Contact other than that indicated is prevented by the use of insulating tubes 26, 27, which serve to space the screens 25 from each other and insulate such screens from the rods as desired. The tube 10 supports at its upper end a perforated band 28 by means of a flange 29 carried inside of such band. The upper end of the band 28 is closed by a cover 30.

The electrical connections involved are as follows: A plug 31 adapted to be used in connection with any of the ordinary electrical systems is connected by wires 32 and 33 with the primary winding 15 of the transformer. The wires 32 and 33 are also extended in a parallel path through wires 34 and 35 to the magnets 23. The secondary winding 16 of the transformer is connected by wires 36 and 37 with the rods 24 and 24$^a$. As a result of the connections described, when the plug 31 is connected to an alternating current source of electricity the transformer is energized and the screens 25 are highly charged electrically, alternate ones of such screens being charged with electrification of one sign, while the intermediate screens are oppositely charged. The potential of the charge may be regulated as desired by the design of the transformer windings. In practice I have found it desirable to employ a sufficiently high potential to produce an intense condition of electrification, such potential, however, not being quite sufficient to produce a disruptive discharge between the several screens. The condition of disruptive discharge is to be avoided in all cases, since this condition instead of producing the ozone above referred to, which is particularly desirable, operates to make the air worse than it was before by causing a chemical combination between the nitrogen and oxygen of the air to form very poisonous nitrous oxids.

The fan 20 by its operation imparts an upward tendency to the air admitted through the base 12, as a result of which this air is passed through the screen 25 and thus through the zones of electrical charge. After passing through the uppermost screen 25, the purified and ozonized air is discharged from the device through the perforations in the band 28. A horizontal annular partition 20$^a$ is provided around the fan 20 to prevent local circulation of the air, which would thus render the apparatus inoperative.

In the operation of the transformer the magnetic paths 18 will be heated to a certain extent, and it is to be noted that the heat thus generated is communicated in large part to the air passing between and around these magnetic paths, with the result that the tendency of the air to pass upward in the tube 10 is increased and also that the energy which would otherwise be lost in the production of heat in the magnetic paths is in part made use of. If desired, the fan 20 may be replaced by a lamp or heating coil, which may be connected to the primary circuit for the purpose of causing the air to be purified to pass through the screens 25 and thus through the electrified zones.

In Fig. 4 I have shown a modified arrangement of the screens 25, in which all of the screens are connected to the rod 24$^b$, which in turn is connected by wire 36 with one terminal of the secondary winding 16 of the transformer. The other terminal of the secondary winding is entirely disconnected in this arrangement, and the condition of charge produced around the screens 25 results from what may be called a purely static effect, no condenser action being present. In connection with this arrangement of the screens I have shown deflecting plates 38, 39 of insulating material, as glass, for retarding the passage of air to a certain degree as it goes through the tube 10 and for therefore producing a more effective action of the electrification upon the air. The plates 38 are of the same external diameter as the screens 25, and each of them is provided with a central opening of about half the area of one of the screens 25. These plates 38 are associated with alternate ones of the screens 25. The plates 39 are associated with intermediate ones of the screens 25, and these plates are somewhat larger than the openings in the plate 38 and are so disposed as to be practically over such openings. As a result of this arrangement the air is caused to take the irregular paths through the screens 25 indicated by the dotted lines.

In either of the arrangements above described it is to be understood that the screens are insulated from all of the rods 24 except those referred to as used to make connection with the secondary winding 16 of the transformer.

As shown in Figs. 5 and 6, I may employ automatic switches 40 in connection with the base 12 for interrupting the supply circuit when the tube 10 is removed from the base to adjust or clean the device. These switches 40 are connected in circuit as indicated in Fig. 6, the supply wires 32 and 33 extending to contacts 41 and 41$^a$. The switches 40 are connected by wires 42 and 43 to the terminals of the primary winding 15 of the transformer. The switches 40 extend into the annular groove 11, as a result of which, when the tube 10 is placed in position in the groove, the switches are pressed down into engagement with the contacts 41 and 41$^a$, thus closing the primary circuit. This precaution I find desirable on account of the high potentials developed by the transformer.

The detail shown in Fig. 7 illustrates the manner in which a complete and continuous zone of electrification may be considered to be produced by the wires of the screen 25. While this illustration is purely diagrammatic, it illustrates clearly the impossibility of any air passing through one of the screens 25 without coming into contact and being influenced by the electrical charge surrounding the wires of the screen.

In order to prevent a tendency to disruptive discharge it is desirable that all sharp corners and projections in connection with the circuit from the secondary winding of the transformer be avoided. It is, therefore, desirable to protect the edges of the screens 25. This may be done in a variety of ways, one of which is indicated in Fig. 8, consisting in forming a thin strip of metal around the edge of each disk, the strip of metal when formed being preferably filled with solder. If desired, the solder may be used alone to cover up the sharp edges left by cutting the wires of the screen.

The modification shown in Fig. 10 is similar in the arrangement of the screens and inclosing tube to that described above. In this arrangement use is made of a motor generator 44 adapted to be run by direct current and provided with collector rings 45, 45$^a$, for transforming the direct current in part into an alternating current. Wires 46 and 47 lead from brushes 48 and 49 coöperating with the collector rings 45 and 45$^a$ to the primary winding 15 of the transformer. The motor generator 44 carries upon its shaft a fan 50 located within a shield 10$^a$ formed upon the end of the tube 10 or secured thereto in such a manner that the rotation of the fan 50 forces the air to be purified through the several screens contained within the tube 10. In this modification the other end of the tube 10 is closed by a disk 12$^a$, which is provided with a perforated shield 51 to protect the high tension terminals. The extension 10$^a$ serves to prevent the air from passing sidewise out of the machine after passing through the fan 50, and also causes all the air engaged by the fan 50 to pass through the tube 10 and through such screens.

While the screens shown in the arrangement of Figs. 1 and 4 are disposed in a horizontal position, and the screens in the modification shown in Fig. 10 are disposed in a vertical position, it is to be understood that in either arrangement the screens may be disposed as desired, it not being necessary to have the screens in any particular position in order to render the device effective. Both of the arrangements of the screens 25 described above provide that the air in passing through the machine shall pass through one screen after another in what may be termed a series relation. This arrangement of the screens is desirable to produce the largest possible quantities of ozone for a given quantity of air. It is not, however, as desirable when a smaller amount of ozone is sufficient and it is desired to purify larger quantities of air. An arrangement of screens adapted to meet the latter condition is shown in Fig. 12, in which the arrangement is as follows: Assuming a general structure of machine similar to that shown in Fig. 1, a cylindrical screen 52 is first mounted in position upon the rods 24, 24$^a$. Immediately above this screen a ring 53 of glass is placed. Next, a ring 54 of gauze similar to the disk 52 is placed upon the ring 53. Next, a glass ring 53 is placed upon the gauze ring 54, then a gauze disk 52, then a glass ring 53 and so on, glass and gauze alternating, every other gauze element being a disk and the intermediate gauze elements being rings. The gauze rings 54 are of a sufficiently smaller outside diameter and a sufficiently larger inside diameter than the glass rings 53 in order that the electrical potential impressed upon the gauze rings 54 and disks 52 may not cause a discharge around the edges of the rings 53. The gauze disks 52 and rings 54 are connected so that alternate ones are in contact with the rod 24, while the intermediate ones are in contact with the rod 24ª, as indicated. As a result of this arrangement, the secondary potential developed by the transformer may be materially reduced, since the condenser surfaces formed by the gauze rings and disks are brought more closely together than in the modification above described. The rings 53 and disk 55 are of smaller diameter than the inside of the casing 10. In order to cause the air to pass through the gauze rings 54 and disks 52 a glass ring 56 is located immediately beneath the lower gauze disk 52, such ring 56 having an outside diameter equal to the inside diameter of the casing 10 and being provided with a hole of approximately the same diameter as the hole in the ring 53. As a result of this construction, when the air is caused to pass upward through the casing 10 by means of the fan 20 or the heat coil described, it passes in parallel paths radially through the several gauze rings 54 and disks 52, and after passing therethrough into the space surrounding these disks, passes upward in the casing 10 and out through the band 28, as in the modification described in connection with Figs. 1 and 4.

As shown in Fig. 12, the potential developed by the secondary winding of the transformer may be regulated by means of a switch 58 pivoted to the base at 59, such switch being operated by a button 60 so as to make contact with any desired one of the contacts 61, 62, 63 and 64. In this modification of my invention the primary winding of the transformer is provided with leads 65, 66, 67 and 68 connected to the primary winding 15 of the transformer, by means of which the full electromotive force, three-quarters, one-half or one-quarter of this electromotive force, may be produced, respectively, as desired, according to the position of the switch 60 upon the contacts 61, 62, 63 and 64, to which the leads 65, 66, 67 and 68 are connected. By this modification, wires 32 and 33 extending to the plug 31 are connected, respectively, with one of the terminals of the primary winding 15 and the pivotal point 59 of the switch 58. The arrangement of the switch 58, contacts 61, 62, 63, 64 and the connections of the primary winding thereto are diagrammatically indicated in Fig. 13, which is a bottom view of the base shown in Fig. 12. By means of this arrangement I am enabled to adjust the voltage developed between the terminals of the secondary winding of the transformer and thus to regulate the intensity of the charges of the filtering and purifying screens. This is desirable, since for some uses it is not advisable to produce as large a proportion of ozone for a given quantity of air as is desirable under other conditions. In the modification shown in Fig. 12 I have also provided a means for causing the air to pass through my machine when vertically disposed. This consists in replacing the fan 20 by a resistance coil 57 or equivalent heating device, as an incandescent lamp, which coil is connected to the wires 32 and 33, as indicated. In this modification the air heated by the coil 57 is caused to pass upward through the machine and prevented from circulating locally by a horizontal partition 80.

In the operation of my machine I find that the electrified condition of the screens causes the separation of particles of dust and dirt from the air treated and that such dust and dirt is retained by the screens, thus filtering as well as sterilizing the air.

While I have shown my invention in the particular embodiment herein disclosed, I do not, however, limit myself to this construction, but desire to claim broadly any equivalent that will suggest itself to those skilled in the art.

What I claim is:

1. Means for filtering air and producing ozone comprising the combination of an inclosing casing, a screen disposed within the casing, a step-up transformer, a connection from one terminal of the high tension winding thereof to such screen, and means for passing the air to be purified through such screen, the core of such transformer so disposed as to assist by its heating effect in circulating the air to be purified through the casing and through such screen.

2. Means for filtering air and producing ozone comprising the combination of an inclosing casing, screens disposed within the casing, a step-up transformer, a connection from one of the terminals of the high tension winding thereof to alternate screens, a second connection from the other terminal of the high tension winding to the intermediate screens, and means for passing the air to be purified through such screens, the core of such transformer so disposed as to assist by its heating effect in circulating the air to be purified through the casing and through such screens.

3. Means for filtering air and producing ozone comprising the combination of an inclosing casing, a conducting wire screen disposed within and across the casing, a step-up transformer, a connection from one terminal of the high tension winding thereof to such screen, and an electrically driven fan for driving the air to be purified through the casing and through such screen, the core of such transformer so disposed as to assist by its heating effect in circulating the air to be purified through the casing and through such screen.

4. Means for filtering air and producing ozone comprising the combination of an inclosing casing, a screen disposed within the casing, a step-up transformer, a connection from one terminal of the high tension winding thereof to such screen, means for passing the air to be purified through such screen, the core of such transformer so disposed as to assist by its heating effect in circulating the air to be purified through the casing and through such screen, and means for regulating the potential developed by the high tension winding of the transformer.

5. Means for filtering air and producing ozone comprising the combination of an inclosing casing, screens disposed within the casing, a step-up transformer, a connection from one of the terminals of the high tension winding thereof to alternate screens, a second connection from the other terminal of the high tension winding to the intermediate screens, means for passing the air to be purified through such screens, the core of such transformer so disposed as to assist by its heating effect in circulating the air to be purified through the casing and through such screens, and means for regulating the potential developed by the high tension winding of the transformer.

6. Means for filtering air and producing ozone comprising the combination of an inclosing casing, a screen disposed within the casing, a step-up transformer, a connection from one terminal of the high tension winding thereof to such screen, and means for passing the air to be purified through such screen, the core of such transformer so disposed as to assist by its heating effect in circulating the air to be purified through the casing and through such screen, such screen adapted to ozonize and filter the air passing therethrough.

7. Means for filtering air and producing ozone comprising the combination of an inclosing casing, screens disposed within the casing, a step-up transformer, a connection from one of the terminals of the high tension winding thereof to alternate screens, a second connection from the other terminal of the high tension winding to the intermediate screens, and means for passing the air to be purified through such screens, the core of such transformer so disposed as to assist by its heating effect in circulating the air to be purified through the casing and through such screens, such screens adapted to ozonize and filter the air passing therethrough.

8. In an air purifying device, the combination of a casing forming a vertical passageway, electrodes arranged in the upper part of said passageway in the path of air flow therethrough, a transformer arranged in said passageway below said electrodes and connected with said electrodes to create a high potential electrical field adjacent thereto, said transformer having a core provided with vertical passageways, and means within the passageway for generating upward flow of air through said passageways and electrodes whereby said air is purified by contact with the electrical field and said transformer cooled.

9. In an air purifying device, the combination of a casing forming a passageway for air to be purified, electrodes disposed in one end of said passageway, a transformer within said passageway connected with said electrodes to generate a high tension electrical field adjacent thereto, and means for forcing air to be purified to flow through said passageway adjacent said electrodes, said transformer having ventilating passageways interposed in the path of the air flow whereby said transformer is cooled.

10. In an air purifying device, the combination of an inclosing casing, a row of electrodes arranged parallelly in said casing and extending transversely thereof, and supporting posts for supporting said electrodes and having electrical contact with alternate electrodes, which said supporting posts being adapted for connection with a source of electricity and forming terminals for said electrodes.

11. In an air purifying device, the combination of a base, a casing supported on said base and forming a passageway for air to be purified, terminal posts extending from said base through said passageway, electrodes extending transversely across said passageway, alternate electrodes having electrical connection with one of said posts and the other electrodes having electrical connection with the other posts, a transformer mounted on said base within said passageway and connected with said posts to thereby cause the generation of an electrical field about said electrodes, and means for forcing air to flow through said passageway and through said electrodes to be purified upon engagement with said electrical field.

12. In an electrical air purifying device, electrodes in the form of wire screen disks each having a smooth surfaced rim engaging about its periphery for preventing disruptive discharges between the electrodes.

13. In combination, a base, a casing detachably mounted on said base, electrical apparatus within said casing, contact points on said base having external conductors leading therefrom, and contact springs on said base automatically held in engagement with said contact points by said casing when in position on said base, said contact springs automatically leaving said contact points upon removal of said casing from said base.

14. In an ozone producing machine, the combination of a base, a casing to be supported by said base, electrodes within said casing, contact arms on said base having connection with said electrodes, and contact terminals on said base connecting with external conductors, said contact arms being arranged to disconnect from said contact terminals when the casing is removed from the base and to be automatically carried into engagement with said contact terminals upon application of the casing to the base.

15. In an ozone producing machine, the combination of a base, a casing detachably mounted on said base, electrodes within said casing, a circuit for connecting said electrodes with a source of current supply, and means whereby said circuit is automatically opened upon removal of the casing from said base.

16. In an electrical air purifying machine, the combination of a supporting base, a casing mounted on said base, electrodes arranged within said casing at the upper end thereof, a transformer mounted on said base within said casing and having connection with said electrodes to generate a high potential electrical field adjacent thereto, air inlets into the lower end of said casing, air outlets at the upper end of said casing, and mechanism mounted on said transformer within the casing for causing upward flow of air through said casing.

17. In an electrical air purifying machine, the combination of a supporting base, a casing mounted on said base, electrodes arranged within said casing at the upper end thereof, a transformer mounted on said base within said casing and having connection with said electrodes to generate a high potential electrical field adjacent thereto, air inlets into the lower end of said casing, air outlet at the upper end of said casing, and mechanism mounted on said transformer within the casing for causing upward flow of air through said casing, said transformer being directly in the path of such air flow.

18. In a electrical air purifying machine, the combination of a casing, a series of electrodes arranged within said casing and each being in the form of a wire screen, means for generating a high potential electrical field about said electrodes, means for causing current flow through said casing and electrodes, and baffle plates arranged on said electrodes to control the flow of air therethrough.

19. In an electrical air purifying machine, the combination of a casing, a series of electrodes arranged within said casing and each being in the form of a wire screen, means for generating a high potential electrical field about said electrodes, means for causing current flow through said casing and electrodes, and baffle plates arranged in staggered arrangement on said electrodes to distribute the flow of air through said electrodes.

In witness whereof, I hereunto subscribe my name this 5th day of May A. D. 1909.

SAMUEL C. SHAFFNER.

Witnesses:
ALBERT C. BELL,
GEORGE E. HIGHAM.